US012236070B2

(12) United States Patent
Okuzawa

(10) Patent No.: US 12,236,070 B2
(45) Date of Patent: Feb. 25, 2025

(54) MEAL PLANNING MENU PROPOSAL SYSTEM

(71) Applicant: Susumu Okuzawa, Kanagawa (JP)

(72) Inventor: Susumu Okuzawa, Kanagawa (JP)

( * ) Notice: Subject to any disclaimer, the term of this patent is extended or adjusted under 35 U.S.C. 154(b) by 0 days.

(21) Appl. No.: 17/630,934

(22) PCT Filed: May 21, 2020

(86) PCT No.: PCT/JP2020/020175
§ 371 (c)(1),
(2) Date: Jan. 28, 2022

(87) PCT Pub. No.: WO2021/019878
PCT Pub. Date: Feb. 4, 2021

(65) Prior Publication Data
US 2022/0276769 A1 Sep. 1, 2022

(30) Foreign Application Priority Data
Jul. 29, 2019 (JP) .................................. 2019-138452

(51) Int. Cl.
*G06F 3/0482* (2013.01)
*G06F 3/04845* (2022.01)
(Continued)

(52) U.S. Cl.
CPC ........ *G06F 3/04845* (2013.01); *G06F 3/0482* (2013.01); *G06F 3/0488* (2013.01); *G06V 20/68* (2022.01)

(58) Field of Classification Search
CPC .. G06F 3/04845; G06F 3/0482; G06F 3/0488; G06V 20/68; G06Q 50/10
See application file for complete search history.

(56) References Cited

U.S. PATENT DOCUMENTS 9,159,094 B2 * 10/2015 Hurst .................... G06Q 50/12
10,640,357 B2 * 5/2020 Burks .................. G06Q 20/326
(Continued)

FOREIGN PATENT DOCUMENTS

| JP | 2003-203123 A | 7/2003 |
| JP | 2011-108115 A | 6/2011 |

(Continued)

OTHER PUBLICATIONS

International Search Report of International Patent Application No. PCT/JP2020/020175 completed on Jul. 13, 2020 and mailed Jul. 28, 2020 (5 pages).

(Continued)

*Primary Examiner* — Hien L Duong
(74) *Attorney, Agent, or Firm* — Pyprus Pte Ltd; George D. Liu

(57) ABSTRACT

[Problem] To provide a system in which candidates for breakfast, lunch, and dinner can be visually attractively expressed, and when wanting to change lunch while adopting breakfast and dinner, only a candidate for lunch can be changed to the next candidate while being visually attractively expressed. [Solution] This dish menu proposal system, which displays a dish menu proposal on a screen which is a touch panel, has: a dish storage unit that stores a plurality of dishes and a plurality of dish images; a menu proposal unit that proposes two or more menus for breakfast, lunch, and dinner, respectively; a menu display unit that displays, on a breakfast display section, a lunch display section, and a dinner display section on the screen, menu images for the breakfast, lunch, and dinner; and a menu update display unit that when a slide input has been performed on any among the breakfast display section, the lunch display section, and the dinner display section, slides the slide-input menu image (Continued)

for the breakfast, lunch, or dinner on a second menu image pertaining to a second menu.

4 Claims, 4 Drawing Sheets

(51) Int. Cl.
*G06F 3/0488* (2022.01)
*G06V 20/68* (2022.01)

(56) References Cited

U.S. PATENT DOCUMENTS

| | | | | |
|---|---|---|---|---|
| 11,507,260 | B2* | 11/2022 | Yoshida | G09G 5/00 |
| 2009/0259559 | A1* | 10/2009 | Carroll | G06Q 20/20 |
| | | | | 705/25 |
| 2011/0320131 | A1* | 12/2011 | Hibino | G16H 40/67 |
| | | | | 702/19 |
| 2012/0200525 | A1* | 8/2012 | Yamamoto | G06Q 10/10 |
| | | | | 345/173 |
| 2013/0058566 | A1* | 3/2013 | Sato | G06T 7/0004 |
| | | | | 382/159 |
| 2013/0130208 | A1* | 5/2013 | Riscalla | G06Q 30/0621 |
| | | | | 434/127 |
| 2014/0119614 | A1* | 5/2014 | Mochizuki | G06F 16/5838 |
| | | | | 382/110 |
| 2014/0193783 | A1* | 7/2014 | Jeong | F25D 29/00 |
| | | | | 434/127 |
| 2015/0132725 | A1* | 5/2015 | Okubo | G06Q 50/10 |
| | | | | 434/127 |
| 2015/0339002 | A1* | 11/2015 | Arnold | G06F 3/0481 |
| | | | | 715/854 |
| 2016/0284074 | A1* | 9/2016 | Mochizuki | G06F 18/00 |
| 2018/0018825 | A1* | 1/2018 | Kim | G02B 27/0093 |
| 2018/0232121 | A1* | 8/2018 | Lewis | G06F 3/0485 |
| 2018/0286276 | A1* | 10/2018 | Lee | G09B 5/02 |
| 2018/0308143 | A1* | 10/2018 | Chan | G06Q 30/0641 |
| 2019/0108287 | A1* | 4/2019 | Murdoch | G06Q 30/0641 |
| 2019/0200797 | A1* | 7/2019 | Diao | A47J 29/00 |
| 2019/0228463 | A1* | 7/2019 | Chan | G06F 3/0488 |
| 2020/0066181 | A1* | 2/2020 | Hadjigeorgiou | G16H 20/60 |
| 2020/0265508 | A1* | 8/2020 | Fuellgraf | G06K 7/1417 |
| 2020/0327976 | A1* | 10/2020 | Pryor | G16H 40/63 |
| 2021/0097592 | A1* | 4/2021 | Yamamoto | G06Q 10/025 |
| 2021/0313039 | A1* | 10/2021 | Katz | G09B 5/02 |
| 2021/0333956 | A1* | 10/2021 | Takahashi | G06F 3/0485 |

FOREIGN PATENT DOCUMENTS

| | | |
|---|---|---|
| JP | 2012-203834 A | 10/2012 |
| JP | 2019-23822 A | 2/2019 |

OTHER PUBLICATIONS

Written Opinion of International Patent Application No. PCT/JP2020/020175 completed on Jul. 13, 2020 and mailed Jul. 28, 2020 (4 pages).

"Menu plan 3" (online), Dec. 16, 2015, [retrieved on Jul. 13, 2020], Internet <URL:https:/ameblo.jp/hiiroon/entry-12106905525.html>, pp. 1-6.

"1-week menu app 'me:new' is convenient!" (online), Dec. 1, 2018, [retrieved on Jul. 13, 2020], Internet <URL: https://digimamalife.com/kondate-1week-appli>, pp. 1-18.

* cited by examiner

[Fig. 1]
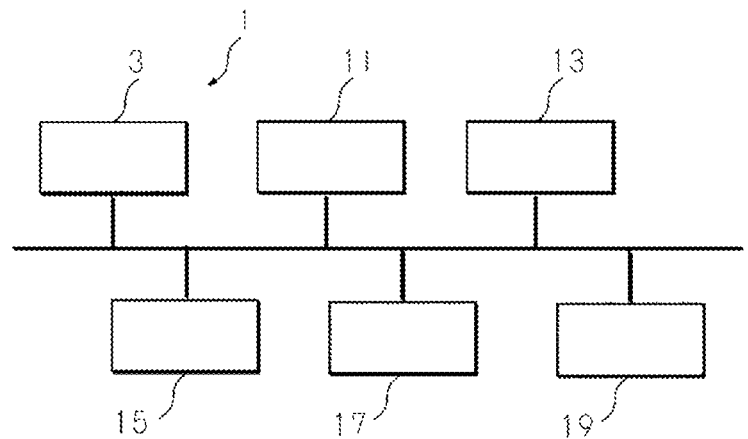
[Fig. 2]
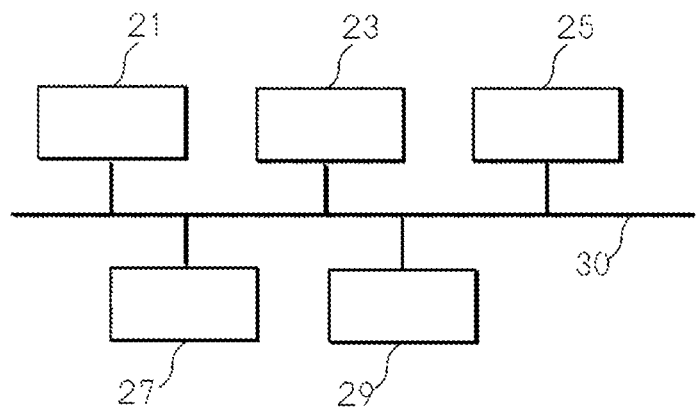

[Fig. 3]
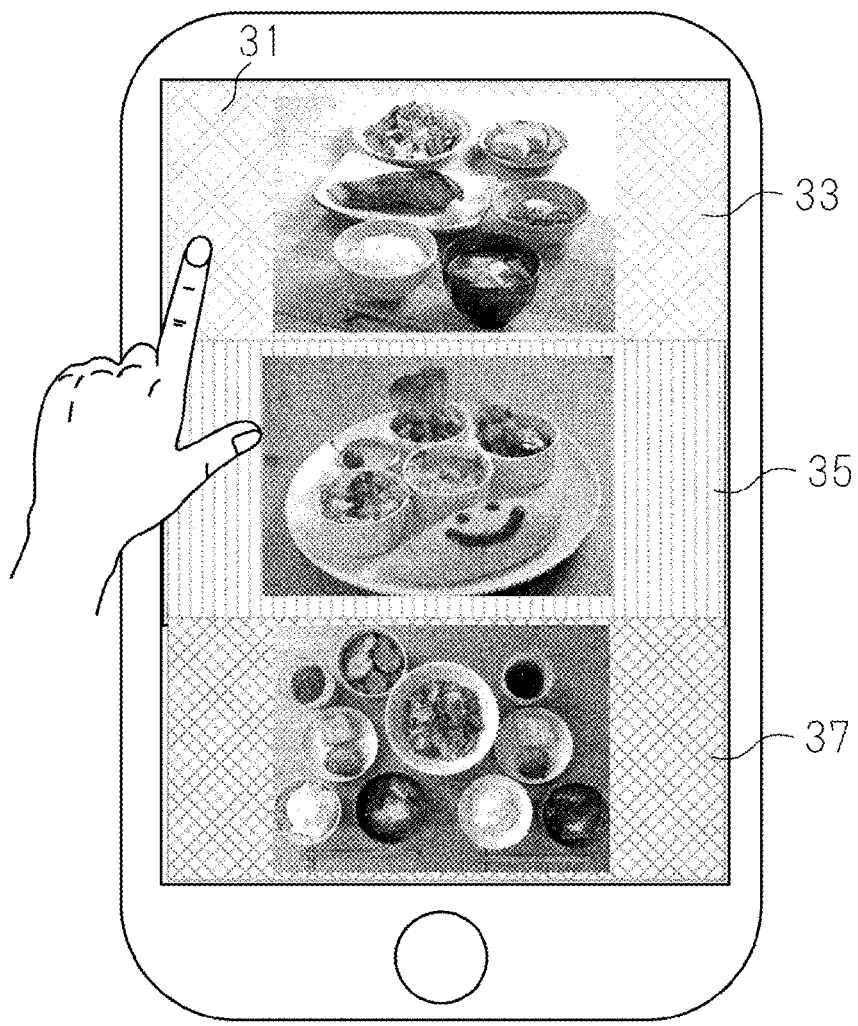

[Fig. 4]
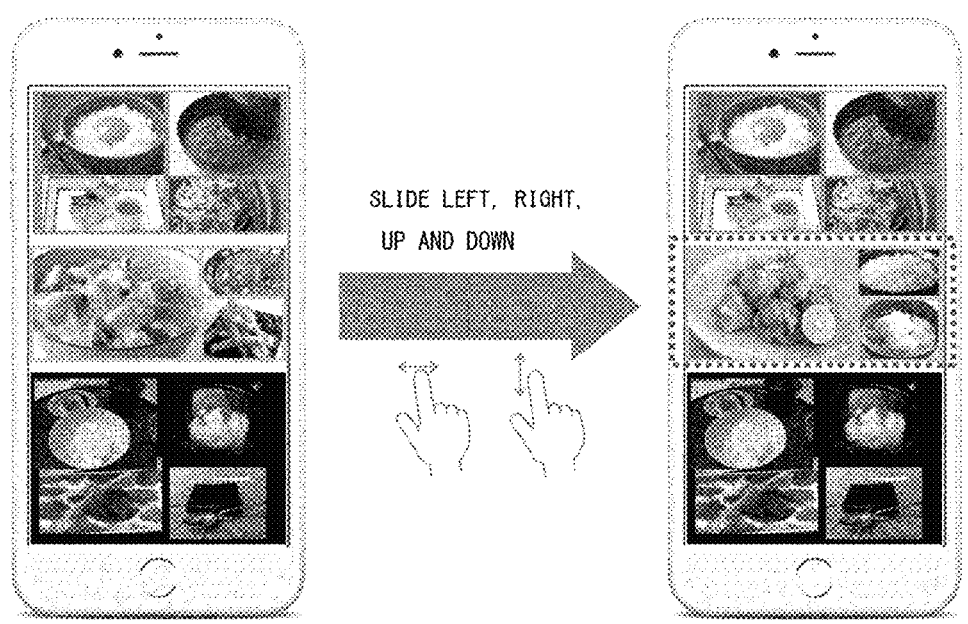

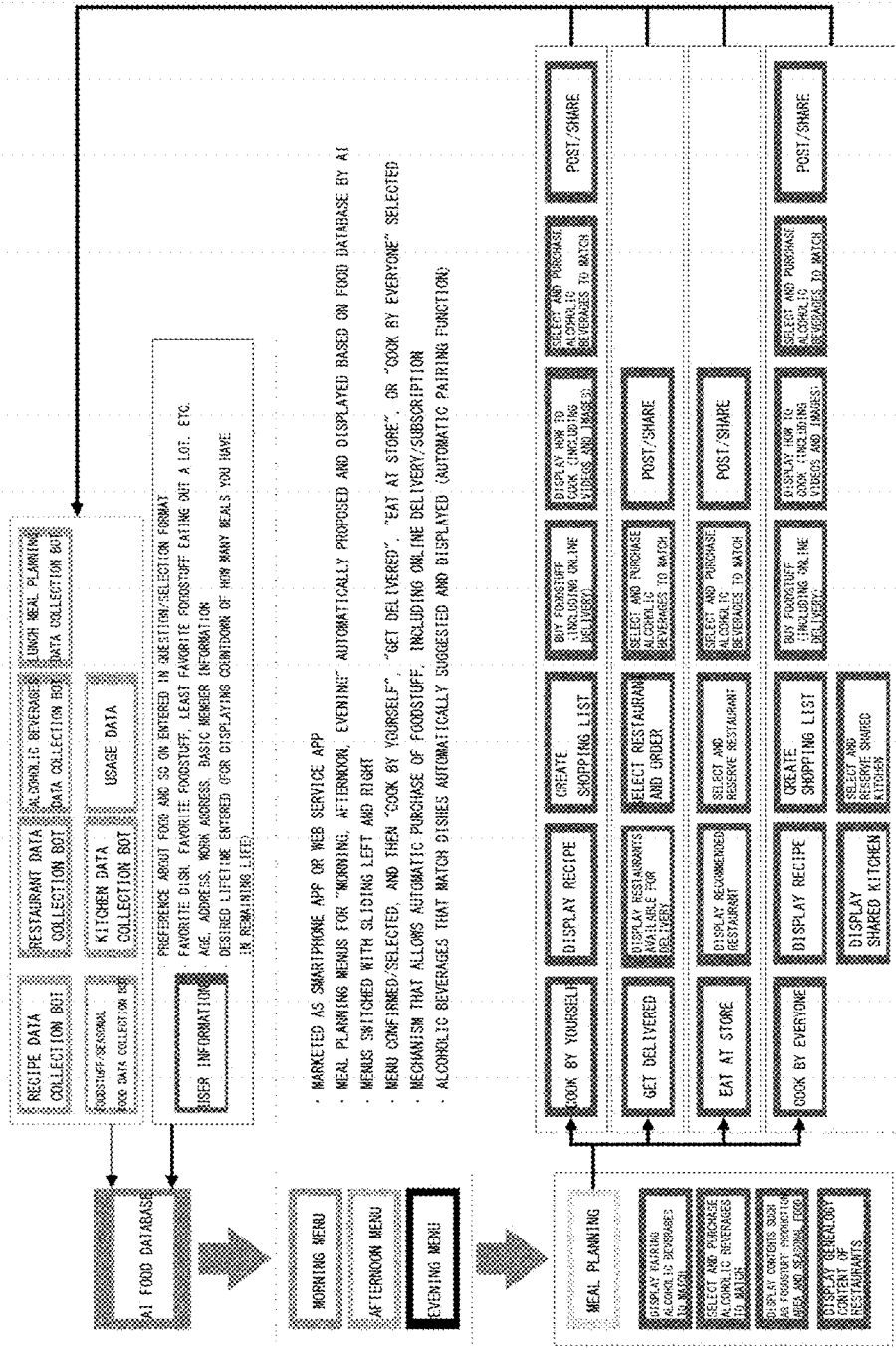
[Fig. 5]

MEAL PLANNING MENU PROPOSAL SYSTEM

TECHNICAL FIELD

The present invention relates to a meal planning menu proposal system.

BACKGROUND ART

Japanese Patent Application Publication No. 2011-108115 describes a meal menu management device. This meal menu management device is a device that allows a user to easily manage meal menus.

CITATION LIST

Patent Literature

PTL 1 Japanese Patent Application Publication No. 2011-108115

SUMMARY OF INVENTION

Technical Problem

The above-mentioned meal menu management device has a problem of failing to visually show and attractively display candidates for breakfast, lunch, and dinner. Further, for example, for a request to adopt the breakfast and dinner in a candidate but change the lunch, there is a problem of being not able to present a next candidate in which a candidate only for lunch is visually shown.

Solution to Problem

The above problem can be solved by displaying a candidate menu for each of breakfast, lunch, and dinner on a screen such that sliding a part of the menu can change the slid meal to the next candidate.

One invention described herein relates to a meal planning menu proposal system that displays a proposal for a meal planning menu on a screen as a touch panel.

This system 1 has a dish storage unit 3, a menu proposal unit 5, a menu display unit 7, and a menu update display unit 9.

The dish storage unit 3 is an element for storing a plurality of dishes and images of the plurality of dishes. The menu proposal unit 5 is an element for proposing two or more menus for each of breakfast, lunch, and dinner, including a first menu and a second menu.

The menu display unit 7 is an element for reading out images of dishes included in the first menus of the breakfast, lunch, and dinner menus from the dish storage unit, and displaying the images in a breakfast display section, a lunch display section, and a dinner display section on the screen as menu images for breakfast, lunch, and dinner, respectively.

The menu update display unit 9 is an element for, in response to a slide input to any of the breakfast display section, the lunch display section, and the dinner display section on the screen, sliding the menu image for breakfast, lunch, or dinner to which the slide input is made to a second menu image for the corresponding second menu.

The above-mentioned configuration makes it possible for the above system to perform a display control in which a candidate menu for each of breakfast, lunch, and dinner is displayed on a screen such that sliding a part of the menu changes the slid meal to the next candidate.

A preferred aspect of the above system is for a plurality of dishes which are divided into categories containing staple food, main dish, side dish, and main soup.

Another invention described herein is a program for causing a computer to function as the above system.

Advantageous Effects of Invention

According to the present invention, it is possible to provide a meal planning menu proposal system that can visually show and attractively display candidates for breakfast, lunch, and dinner. Further, according to the present invention, it is possible to provide a meal planning menu proposal system that can present, for example, for a request to adopt the breakfast and dinner in a candidate but change the lunch, a next candidate in which a candidate only for lunch is visually shown.

BRIEF DESCRIPTION OF DRAWINGS

FIG. 1 is a block diagram illustrating a configuration example of a meal planning menu proposal system.

FIG. 2 is a block diagram illustrating an example of a computer system.

FIG. 3 is a conceptual diagram illustrating an example of a display screen.

FIG. 4 is a diagram illustrating an example of a display screen for a smartphone or a tablet.

FIG. 5 is a conceptual diagram illustrating an outline of the system.

DESCRIPTION OF EMBODIMENTS

Embodiments of the present invention will be described below with reference to the drawings. The present invention is not limited to the embodiments described below, and includes modifications of the following embodiments as appropriate within a scope obvious to those skilled in the art.

FIG. 1 is a block diagram illustrating a configuration example of a meal planning menu proposal system. The meal planning menu proposal system is a system for displaying a proposal for a meal planning menu on a screen as a touch panel. As illustrated in FIG. 1, this system 1 has a dish storage unit 3, a menu proposal unit 5, a menu display unit 7, and a menu update display unit 9.

The meal planning menu proposal system is a system for displaying a proposal for a meal planning menu on a screen as a touch panel. This system is basically a computer-aided system. The system may optionally include terminals, computers, and servers. An example of this system may be implemented on a user's mobile terminal (e.g., a smartphone or a tablet terminal), or over a user's mobile terminal and a computer server. The user's mobile terminal also functions as one computer. The user's mobile terminal has a screen for displaying information, and the screen is a touch panel.

FIG. 2 is a block diagram illustrating a basic configuration of a computer. As illustrated in FIG. 2, the computer includes an input unit 21, an output unit 23, a control unit 25, a computation unit 27, and a storage unit 29, and these elements are connected by a bus 30 or the like so that information can be exchanged therebetween. For example, the storage unit may store a control program and/or various information. When specified information is input from the input unit, the control unit reads out a control program stored in the storage unit. Then, the control unit reads out information stored in the storage unit as appropriate and transmits it to the computation unit. The control unit also transmits the input information to the computation unit as appropriate. The computation unit performs operation processing using various received information and stores the result in the storage unit. The control unit reads out the operation result stored in the storage unit and outputs it from the output unit. In this way, various processing is executed. Each unit executes the various corresponding processing.

The dish storage unit 3 is an element for storing a plurality of dishes and images of the plurality of dishes. The storage unit of the computer functions as the dish storage unit. The information on the plurality of dishes may be, for example, information including the names of staple foods, main dishes, side dishes, and main soups (in addition, drinks, desserts, fruits), their respective nutrients, and their respective energies. This information may be stored, for example, in association with the identification number (ID) of each dish. Accordingly, by specifying an identification number, the above-mentioned information on the name, nutrients, and energy of the corresponding dish can be read out. Note that, although fruits and drinks are not to be cooked, they are regarded as one "dish" when they are part of a meal. This system stores, for example, an image of each dish in a storage unit in association with the above-mentioned identification number of the dish. Accordingly, the image of the dish can be read out using the identification number of the dish. The dish storage unit 3 may stores, for example, information other than the above (e.g., information on food classification) in association with the above-mentioned identification number. Examples of food classifications include fruits, meats, fish, vegetables, root vegetables, dairy products, seaweeds, beans, cereals, and alcohols. Further, allergy-related information may be stored in association with the above-mentioned identification number. For example, for a dish containing sesame, information on sesame allergy may be stored in the storage unit in association with the identification number.

The menu proposal unit 5 is an element for proposing two or more menus for each of breakfast, lunch, and dinner, including a first menu and a second menu.

For example, a user information management unit of the user's mobile terminal or a server stores various information on the user. Examples of information on the user include the user's identification number, name, age, gender, allergies, preferences, courses, past acceptable menus, and past unacceptable menus. As for the preference, a questionnaire about the preference may be displayed on the user's screen, information on the user's preference may be collected in advance, and the information may be stored in the user information management unit. The same processing can be performed for the user's allergies to store the information on the user's allergies in the user information management unit. In the case where the user information is managed by the server, the user information may be stored in association with the user identification number (user ID). Examples of courses include senior course, diet course, diabetes course, kidney disease course, athlete course, and muscle training course. Various components such as sugar content, salt content, and protein content may be adjusted according to the corresponding course.

This system may also be configured to propose a menu based on the foodstuffs currently owned by the user. For example, an application that implements a program described later is launched, and then the user takes a picture of the inside of a refrigerator, a picture of the inside of a freezer, and a picture of stored vegetables. Thus, the pictures are input to the user's mobile terminal and stored in the storage unit. Then, according to an instruction from a computer implementing the above application, the mobile terminal, accordingly the mobile terminal reads out the above picture from the storage unit and sends the picture to the server together with the user's identification number. The server receives the picture, stores it in a storage unit of the server as appropriate, analyzes the picture, and analyzes the foodstuffs currently owned by the user. Then, for example, a dish using food stuffs owned by the user is selected from the recipes of a plurality of dishes. In this way, selectable candidate menus can be presented. Note that, at that time, the server may also read out information on the missing foodstuff and information on ordering the missing foodstuff.

For example, a breakfast menu will be described. The user's intention is stored in the system in advance. For example, the calories related to the breakfast meal and the types of staple foods (brown rice desired, white rice desired, bread meal desired, cereal desired, and a mixture thereof) are stored in the storage unit. Accordingly, the system selects a staple food for breakfast based on the read user information. Similarly, for the main dish, side dish, and main soup, the information on the main dish, side dish, and main soup stored in the storage unit is read out based on the user information. Then, a first candidate for breakfast is set in consideration of the calories and the balance of nutritional value. Note that, when allergy information of the user is stored, it is checked that each recipe does not contain the corresponding allergens. After that, the first candidate may be confirmed. Similarly, a second candidate and a third candidate for breakfast are selectable. For the selected menu, images related to the staple food, main dish, side dish, and main soup can be read out to form an image for the first candidate. Further, the information on the calories and nutritional value of the main dish, side dish, and main soup is read out from the storage unit, and for example, the total of the calories is calculated, so that the calories of the first candidate can be obtained. The obtained calories may be displayed as appropriate. Similarly, for lunch and dinner, candidate menus are selectable.

The menu display unit 7 is an element for reading out images of dishes included in the first menus of the breakfast, lunch, and dinner menus from the dish storage unit, and displaying the images in a breakfast display section, a lunch display section, and a dinner display section on the screen as menu images for breakfast, lunch, and dinner, respectively.

FIG. 3 is a conceptual diagram illustrating an example of a display screen. FIG. 3 is an example in which menus are displayed on the screen of a mobile terminal (e.g., a smartphone or tablet) 31. In the example of FIG. 3, the breakfast, lunch, and dinner menus are displayed in this order. Conversely, the breakfast, lunch, and dinner menus may be displayed in order from the bottom. Further, only any two of the breakfast, lunch and dinner menus may be displayed. Further, in addition to the breakfast, lunch and dinner menus, a snack menu may be displayed.

The menu display unit 7 reads out the images of dishes included in the first menus of the breakfast, lunch, and dinner menus from the dish storage unit 3. Then, the read images are displayed in the breakfast display section 33, the lunch display section 35, and the dinner display section 37 on the screen 31 as menu images for breakfast, lunch, and dinner, respectively. As a result, the menu images for breakfast, lunch, and dinner are displayed on the screen 31.

The menu update display unit 9 is an element for, in response to a slide input to any of the breakfast display section, the lunch display section, and the dinner display section on the screen, sliding the menu image for breakfast, lunch, or dinner to which the slide input is made to a second menu image for the corresponding second menu.

For example, in the case where the screen is a touch panel, the menu update display unit 9 detects an input through a user's finger or the like in any of the fields of the breakfast display section 33, the lunch display section 35, and the dinner display section 37 on the screen 31. Upon receiving this input, the menu update display unit 9 grasps the input position and determines that a slide input has been made when the input position changes continuously. Such finger slide input on smartphones is well known. Therefore, also in this system, a known technique can be appropriately adopted to determine whether or not a slide input has been made, the field where the slide input has been made, and the direction of the slide.

The above-mentioned configuration makes it possible for the above system to perform a display control in which a candidate menu for each of breakfast, lunch, and dinner is displayed on a screen such that sliding a part of the menu changes the slid meal to the next candidate.

As a result, the menu update display unit 9 determines that a slide input has been made to any of the breakfast display section 33, the lunch display section 35, and the dinner display section 37 on the screen 31. Then, the images of dishes included in the second menu of the slid breakfast, lunch or dinner menu is read out from the dish storage unit 3. Then, the read images are displayed in the breakfast display section 33, the lunch display section 35, or the dinner display section 37 on the screen 31. As a result, the updated menu images for breakfast, lunch, and dinner are displayed on the screen 31.

Note that, for example, among the breakfast, lunch, and dinner meals, the meal to which a slide input has been made may be controlled so that the background color changes. In other words, the slide-input meal is for which the user desires to pay attention to a new menu. Therefore, if the background color changes, it will be noticeable to the user. In order to realize such an aspect, the storage unit may store a plurality of background colors for each of the breakfast display section 33, the lunch display section 35, and the dinner display section 37, and a display control may be performed in which a second background color for the meal to which a slide input has been made among the breakfast, lunch, and dinner meals is read out to use the read background color.

Note that, for example, among the breakfast, lunch, and dinner meals, the meal to which a slide input has been made may be controlled so that the picture of the corresponding menu is displayed in a large size. This control can be performed as an image control in which, when the images of the staple food, main dish, side dish, and main soup are read out to create a picture for the menu, the picture is set to be 1.05 times or more and twice or less (or 1.05 times or more and 1.2 times or less) as compared with that for the first candidate.

Further, for example, the display control may be such that the section to which a slide input has been made among the breakfast display section 33, the lunch display section 35, and the dinner display section 37 is enlarged. In this case, the display control may be such that the menu image is also enlarged. An example of the magnification in this case is 1.05 times or more and 1.5 times or less (or 1.05 times or more and 1.2 times or less).

A preferred aspect of the above system is for a plurality of dishes which are divided into categories containing staple food, main dish, side dish, and main soup.

Another invention described herein is a program for causing a computer to function as the above system.

EXAMPLES

Based on the above system, the inventor(s) have developed an application for smartphones or tablets. FIG. 4 is a diagram illustrating an example of a display screen for a smartphone or a tablet. When a part of the display screen illustrated in FIG. 4 is slid with a finger, the image of the menu of the slid part is replaced with a next candidate for the menu. Also, when the slide direction is changed, the previously displayed image of the menu will be displayed again. In the example of FIG. 4, there is given a display field for each item such as staple food, main dish, side dish, and main soup included in breakfast, lunch, and dinner meals, and when a menu is changed by slide, the corresponding menu for breakfast, lunch or dinner including a plurality of single items will be changed as a whole. As in the example of FIG. 3, images of items such as staple food, main dish, side dish, and main soup may be synthesized to create a menu image for breakfast, lunch, or dinner.

FIG. 5 is a conceptual diagram illustrating an outline of the system. This application applies the above system. In addition, this application works with various data. However, basically, the candidates for breakfast, lunch, and dinner menus are displayed to allow the user to select. Then, in addition to displaying a recipe, this system is configured to compare the information on the foodstuffs owned by the user with the recipe, and make links to various stores for the missing ingredients, so that it is easy to order the ingredients through the links.

INDUSTRIAL APPLICABILITY

The present invention is available in the information and communication industry.

REFERENCE SIGNS LIST

1 System
3 Dish storage unit
5 Menu proposal unit
7 Menu display unit
9 Menu update display unit

The invention claimed is:
1. A non-transitory computer readable medium which stores a program for causing a computer to function as a meal planning menu proposal system for displaying a proposal for a meal planning menu on a screen as a touch panel, the program being configured to be executed by one or more processors, the meal planning menu proposal system comprising:
   a dish storage means configured to store a plurality of dishes and images of the plurality of dishes;
   a menu proposal means configured to propose two or more menus for each of breakfast, lunch, and dinner, the two or more menus including a first menu and a second menu, the second menu being a menu for a same day as the first menu and being different from the first menu;
   a menu display means configured to read out images of dishes included in the first menus of the breakfast, lunch, and dinner menus from the dish storage means, and simultaneously display the images in a breakfast display section, a lunch display section, and a dinner display section on the screen as menu images for breakfast, lunch, and dinner, respectively; and a menu update display means configured to, in response to a slide input to any one of the breakfast display section, the lunch display section, and the dinner display section on the screen, slide the menu image for breakfast, lunch, or dinner to which the slide input is made to a second menu image for the corresponding second menu, wherein a background color of the menu image for breakfast, lunch, or dinner to which the slide input is made changes and the menu image for breakfast, lunch, or dinner to which the slide input is made is enlarged.

2. The non-transitory computer readable medium according to claim 1, further comprising:

a picture reception means configured to receive a picture; and a foodstuff analysis means configured to perform image analysis on the picture received by the picture reception means to analyze foodstuffs, wherein the menu proposal means proposes menus using the foodstuffs analyzed by the foodstuff analysis means as the first menu and the second menu.

3. A meal planning menu proposal system for displaying a proposal for a meal planning menu on a screen as a touch panel, the meal planning menu proposal system comprising:

a display;

one or more processors;

one or more memory devices that store program configured to be executed by the one or more processors; and a dish storage means configured to store a plurality of dishes and images of the plurality of dishes;

the program contains instructions which, when executed, cause the one or more processors to perform operations comprising:

proposing two or more menus for each of breakfast, lunch, and dinner, the two or more menus including a first menu and a second menu, the second menu being a menu for a same day as the first menu and being different from the first menu;

reading out images of dishes included in the first menus of the breakfast, lunch, and dinner menus from the dish storage means, displaying the menu images for breakfast, lunch, and dinner in a breakfast display section, a lunch display section, and a dinner display section on the screen of the display respectively and simultaneously;

determining a slide input is made to any one of the breakfast display sections, the lunch display section, and the dinner display section to determine a slide input section to which the slide input is made;

sliding out the menu image for breakfast, lunch, or dinner displayed on the slide input section; and displaying the second menu image of the second menu on the slide input section;

wherein a background color of the menu image for breakfast, lunch, or dinner to which the slide input is made changes and the menu image for breakfast, lunch or dinner to which the slide input is made is enlarged.

4. The meal planning menu proposal system according to claim 3, further comprising:

a picture reception means configured to receive a picture; and a foodstuff analysis means configured to perform image analysis on the picture received by the picture reception means to analyze foodstuffs, wherein the menu proposal means proposes menus using the foodstuffs analyzed by the foodstuff analysis means as the first menu and the second menu.

\* \* \* \* \*